United States Patent
Kangas et al.

(10) Patent No.: US 7,555,311 B2
(45) Date of Patent: Jun. 30, 2009

(54) MOBILE COMMUNICATION TERMINAL AND METHOD

(75) Inventors: Tita Kangas, Kaarina (FI); Teemu Laaksonen, Turku (FI); Vesa Heikkola, Espoo (FI); Petri Kokkonen, Espoo (FI)

(73) Assignee: Nokia Corporation, Espoo (FI)

( * ) Notice: Subject to any disclaimer, the term of this patent is extended or adjusted under 35 U.S.C. 154(b) by 284 days.

(21) Appl. No.: 11/236,427

(22) Filed: Sep. 27, 2005

(65) Prior Publication Data

US 2007/0072642 A1      Mar. 29, 2007

(51) Int. Cl.
  *H04M 1/00* (2006.01)
(52) U.S. Cl. .............. 455/552.1; 455/550.1; 455/575.1; 455/90.2
(58) Field of Classification Search .............. 455/550.1, 455/575.1, 90.3
  See application file for complete search history.

(56) References Cited

U.S. PATENT DOCUMENTS

| | | | | |
|---|---|---|---|---|
| 5,966,671 A * | 10/1999 | Mitchell et al. | .......... | 455/550.1 |
| 6,339,706 B1 * | 1/2002 | Tillgren et al. | .............. | 455/419 |
| 6,453,169 B1 * | 9/2002 | Maloney | .................. | 455/575.1 |
| 6,865,403 B1 * | 3/2005 | Averkamp | ................... | 455/564 |
| 7,274,948 B2 * | 9/2007 | Kim et al. | ................. | 455/550.1 |
| 2002/0115425 A1 * | 8/2002 | Carter | ......................... | 455/410 |
| 2005/0049007 A1 * | 3/2005 | Cho | ........................... | 455/566 |

OTHER PUBLICATIONS

"Nokia 6230i user guide, 9236580 Issue 2", Nokia 2005, pp. 1-162.

* cited by examiner

*Primary Examiner*—Temica M Beamer
(74) *Attorney, Agent, or Firm*—Perman & Green, LLP

(57) ABSTRACT

A method is presented for initiating communication in a mobile terminal capable of providing at least a first mode of communication and a second mode of communication, the mobile terminal comprising a communication initiation element. The method involves the steps of detecting a user actuation of the communication initiation element, discriminating between at least a first and a second type of the user actuation, and generating a control signal for initiating communication using the first mode of communication or the second mode of communication, depending on whether the user actuation is of the first type or the second type. A corresponding mobile terminal and a computer program are also presented.

21 Claims, 4 Drawing Sheets

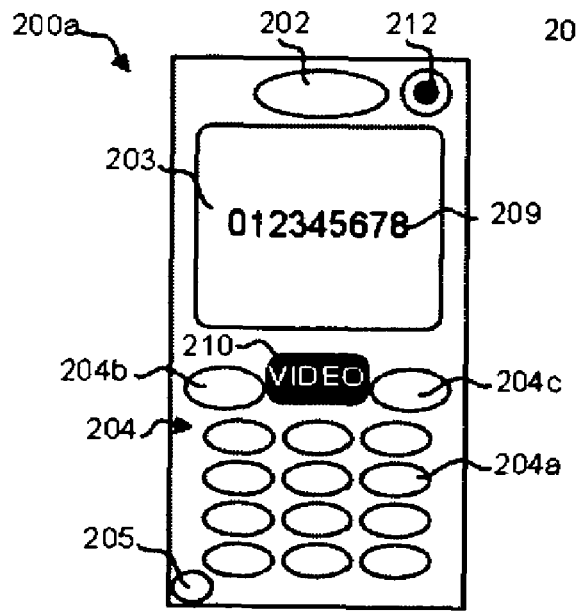
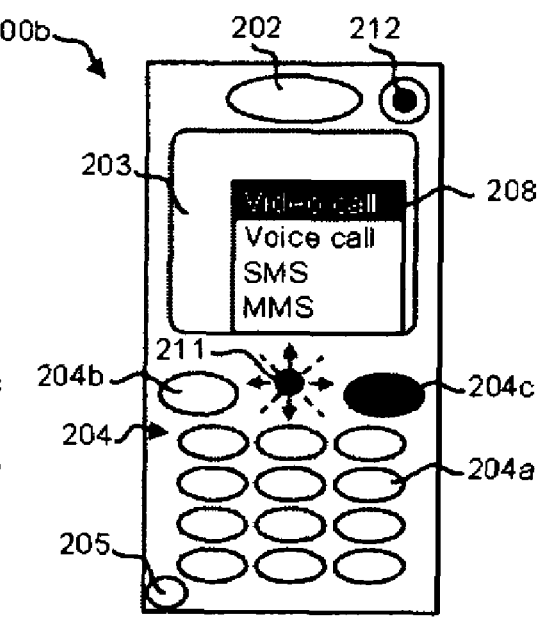
Fig 2A
Prior art
Fig 2B
Prior art
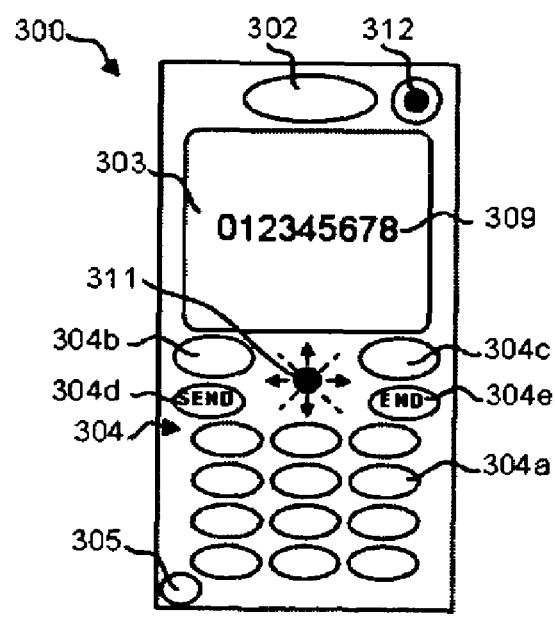
Fig 3

MOBILE COMMUNICATION TERMINAL AND METHOD

FIELD OF THE INVENTION

The present invention generally relates to mobile telecommunication and more particularly to initiating communication in a mobile terminal having several modes of communication.

BACKGROUND OF THE INVENTION

Mobile terminals, or mobile (cellular) telephones, for mobile telecommunications systems like GSM, UMTS, D-AMPS and CDMA2000 have been used for many years now. In the older days, mobile terminals were used almost only for voice communication with other mobile terminals or stationary telephones. More recently, the use of modern terminals has been broadened to include not just voice communication, but also various other services and applications such as video telephony, electronic messaging (e.g. SMS, MMS, email, instant messaging), digital image or video recording, FM radio, music playback, electronic games, calendar/organizer/time planner, word processing, WWW/WAP browser, etc.

Two mobile terminals 200a, 200b of the prior art with both voice and video telephony capability are shown in FIGS. 2A and 2B.

The mobile terminals 200a, 200b each have a user interface which typically includes a display 203 and a keypad 204, the latter including a set of alpha-numeric (ITU-T type) keys 204a. The user interface also comprises acoustic components for sound input and output. These components typically include a microphone 205 and a speaker 202, and additionally often audio I/O ports in an accessories interface. The speaker 202 normally serves to provide acoustic output in the form of human speech, ring signals, music, etc.

As more functionality has been added to mobile terminals, additional input means have been provided for additional efficiency and functionality. For instance, modern mobile terminals are often provided, in addition to an ITU-T type keypad, with function keys/soft keys 204b, 204c (i.e. keys that have different functions in different contexts), a joystick 211 and a camera 212.

With the introduction of third generation mobile communication systems (3G), video telephony has been provided to mobile terminal users. Video telephony may in rare cases only convey visual information, but most commonly video telephony includes both video and voice communication.

A first alternative to allow a user to initiate a video call is shown in FIG. 2A. The user may for example first dial a phone number 209 to an intended receiver of the video call, and then the user may press a dedicated video call key 210. Using the dedicated (separate) video call key 210 to initiate a video call has a disadvantage in that it adds on to the total number of keys in the user interface. Not only will such a separate video call key require some additional space and therefore have negative implications for a mobile terminal designer that seeks to meet market demands for miniaturized terminals, but it will also add on to the total component cost for the user interface. Furthermore, a separate video call key represents yet an additional key that the mobile terminal user must know the meaning and location of.

A second alternative to allow a user to initiate a video call is shown in FIG. 2B. Here, upon having entered an intended receiver's phone number, the user presses a soft key 204c to display a menu 208. From the menu 208 the user selects to initiate a video call. While this alternative allows a user to initiate a video call without requiring a dedicated video call key, the procedure requires several key presses and time to initiate a video call.

SUMMARY OF THE INVENTION

In view of the above, an objective of the invention is to solve or at least reduce the problems discussed above. The present invention particularly seeks to provide improvements to the user interface of a mobile terminal having multiple types of communication.

When the term "communication initiation element" is used herein, it denotes any input mechanism at the time configured to allow a user to indicate that communication is to be initiated. For example, the communication initiation element may be a dedicated call set-up key such as a "send" key or a "yes" key, a soft key, or a joystick or a multi-way navigation key which is depressible.

Generally, the above objectives are achieved by the attached independent patent claims.

A first aspect of the invention is a mobile terminal comprising:
first communication means capable of a first mode of communication;
second communication means capable of a second mode of communication;
a communication initiation element configured at least part of the time to accept input to initiate communication; and
a controller associated with said communication initiation element,
said controller being adapted to detect a user actuation of said communication initiation element and to discriminate between at least a first and a second type of said user actuation, and
said controller being further adapted to generate a control signal for initiating communication using said first communication means or said second communication means, depending on whether said user actuation is of said first type or said second type.

The controller may be adapted to discriminate between said first and said second type of said user actuation by determining whether or not a duration of said user actuation exceeds a predetermined time period.

Moreover, the controller may be adapted to determine whether to generate a control signal for initiating communication using said first communication means or said second communication means based on said user actuation type and a preferred mode of communication associated with an intended receiver of communication. Such a preferred mode of communication may be stored by a phone book application. If no preferred mode of communication is associated with said intended receiver of communication, said mobile terminal may be adapted to generate a control signal to said first communication means if said first type of user actuation is determined, and to generate a control signal to said second communication means if said second type of user actuation is determined.

In different embodiments, said first communication means may be selected from a group consisting of means for providing voice communication, means for providing video communication, means for providing SMS communication, means for providing MMS communication, means for providing e-mail communication and means for providing instant messaging communication.

Correspondingly, in different embodiments, said second communication means may be selected from a group consisting of means for providing voice communication, means for providing video communication, means for providing SMS communication, means for providing MMS communication, means for providing e-mail communication and means for providing instant messaging communication.

Said communication initiation element may be an element selected from a group consisting of a dedicated send key, a soft key, a multi-way navigation key and a joystick.

In one embodiment of the present invention, said first and second modes of communication are voice communication and video communication, or vice versa; said communication initiation element is a send key; and said first and second types of said user actuation are short-press and long-press of said send key, or vice versa.

Said controller may be further adapted to determine an identifier of an intended receiver of communication, and include said identifier of said intended receiver in said control signal. The controller may be adapted to determine said identifier of said intended receiver of communication from a source selected from a group consisting of a directly entered phone number, a phone book application, an SMS, a MMS, a latest calls list, a call reminder from a calendar application, and a telephony URL.

A second aspect of the present invention is a method for initiating communication in a mobile terminal capable of providing at least a first mode of communication and a second mode of communication, said mobile terminal comprising a communication initiation element, said method involving the steps of:

detecting a user actuation of said communication initiation element;

discriminating between at least a first and a second type of said user actuation; and generating a control signal for initiating communication using said first mode of communication or said second mode of communication, depending on whether said user actuation is of said first type or said second type.

A third aspect of the present invention is a computer program comprising software instructions that, when executed in a mobile terminal, performs the method according to the second aspect of the present invention.

The second and third aspects may generally have the same or corresponding features as those that have been described above for the first aspect.

The invention is advantageous for several reasons. For instance, for an embodiment capable of initiating voice calls and video calls, not only are the problems referred to in the first alternative in the background section of this document alleviated by reducing the need for a separate, dedicated video call key, but it also represents an efficient and intuitive way for a user to initiate a video call. Reducing the need for a separate video call key keeps space requirements low, facilitating keeping the size of the mobile terminal attractively small, and also gives the benefit of lower component costs. Additionally, the user may use the same familiar keys and procedures normally used to initiate a voice call, whereby the simple act of holding down the key to initiate the voice call for a longer period of time will instead initiate a video call. No video call specific key sequences are required to initiate the video call, whereby the time required to initiate a video call is conveniently short.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which:

FIGS. 2A and B are schematic front views illustrating two mobile terminals capable of several modes of communication according to the prior art.

FIG. 3 is a schematic front view illustrating a mobile terminal capable of several modes of communication according to an embodiment of the present invention.

DETAILED DESCRIPTION OF THE INVENTION

Figure 1:
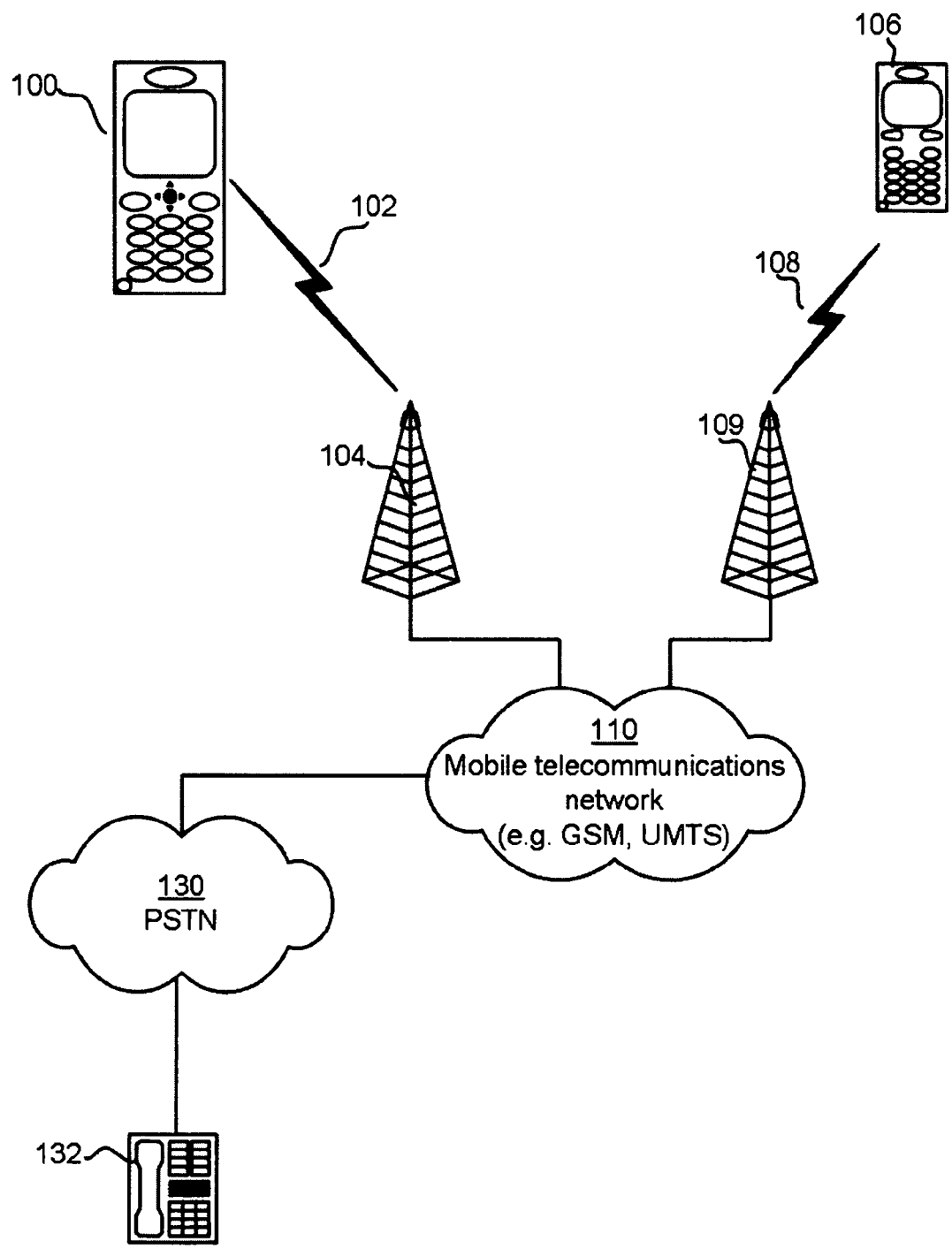
FIG. 1 is a schematic illustration of a cellular telecommunication system in which different modes of communication may be performed between different mobile terminals, as an example of an environment in which the present invention may be applied.

FIG. 1 illustrates an example of a cellular telecommunications system in which the invention may be applied. In the telecommunication system of FIG. 1, various telecommunications services such as cellular voice calls, cellular video calls, data calls, facsimile transmissions, music transmissions, still image transmissions, video transmissions, electronic message transmissions and electronic commerce may be performed between a mobile terminal 100 according to the present invention and other devices, such as another mobile terminal 106 or a stationary telephone 132. It is to be noted that for different embodiments of the mobile terminal 100 and in different situations, different ones of the telecommunications services referred to above may or may not be available; the invention is not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

A public switched telephone network (PSTN) 130 is connected to the mobile telecommunications network 110 in a familiar manner. Various telephone terminals, including the stationary telephone 132, are connected to the PSTN 130.

Preferably, the mobile terminal 100 has video telephony functionality and may thus perform video calls with another video telephony enabled mobile terminal 106 over the mobile telecommunications network 110. In the illustrated example of FIG. 1, video telephony may for example be implemented according to 3GPP standards available on the world wide web under the address of http://www.3gpp.org.

An embodiment 300 of the mobile terminal 100 is illustrated in more detail in FIG. 3. The mobile terminal 300 comprises a speaker or earphone 302, a microphone 305, a display 303, a camera 312 and a set of keys 304 which may include a keypad 304a of common ITU-T type (alpha-numerical keypad representing characters "0"-"9", "*" and "#") and certain other keys such as a "Send" key 304d, an "End" key 304e, soft keys 304b, 304c and a joystick 311. Just like the prior art terminal 200 of FIGS. 2A and 2B, the mobile terminal 300 has video telephony functionality, but it has no dedicated video call key (like key 210 in the prior art terminal 200 of FIG. 2a). Instead, video telephony functionality is selected in this embodiment by long pressing a communication initiation element before calling a receiver. The communication initiation element is the input element that the user may use to set up communication with a remote receiver.

For example, when a user has completed entering a phone number 309 using the keypad 304, the user may short-press on the send key 304d to initiate a voice call to the entered phone number 309. In this case, the communication initiation element is the send key 304d. Similarly, a short press on the joystick 311 may also initiate a call. Correspondingly, a long press on the send key 304d or the joystick 311 will instead result in a video call being initiated.

In another example, the user may use a phone book (contacts) application in the mobile terminal to locate somebody the user wishes to call. A short press on the send key 304d or the joystick 311 will result in a voice call, while a long press on the send button 304d or the joystick 311 will result in a video call. In one embodiment, the user may configure a primary and secondary mode of communication per contact, wherein a short press on the communication initiation element will result in communication by a first communication means using the primary mode of communication and a long press will result in communication by a second communication means using the secondary mode of communication. In this embodiment, if the primary and secondary modes of communication are not configured for a contact, the default primary mode of communication is preferably voice telephony and the default secondary mode of communication is preferably video telephony. Note that not just voice or video communication, but any type of communication, including SMS, MMS, email and instant messaging, could potentially be configured as a primary or secondary mode of communication. Specifically, the present invention may be embodied in a mobile terminal which does not support video telephony.

In one embodiment, the left soft key 304b (or right soft key 304c) may be used as the communication initiation element, whereby a short-press and a long-press of the left soft key 304b (or right soft key 304c) may initiate two different modes of communication, such as voice communication and video communication.

Figure 4:
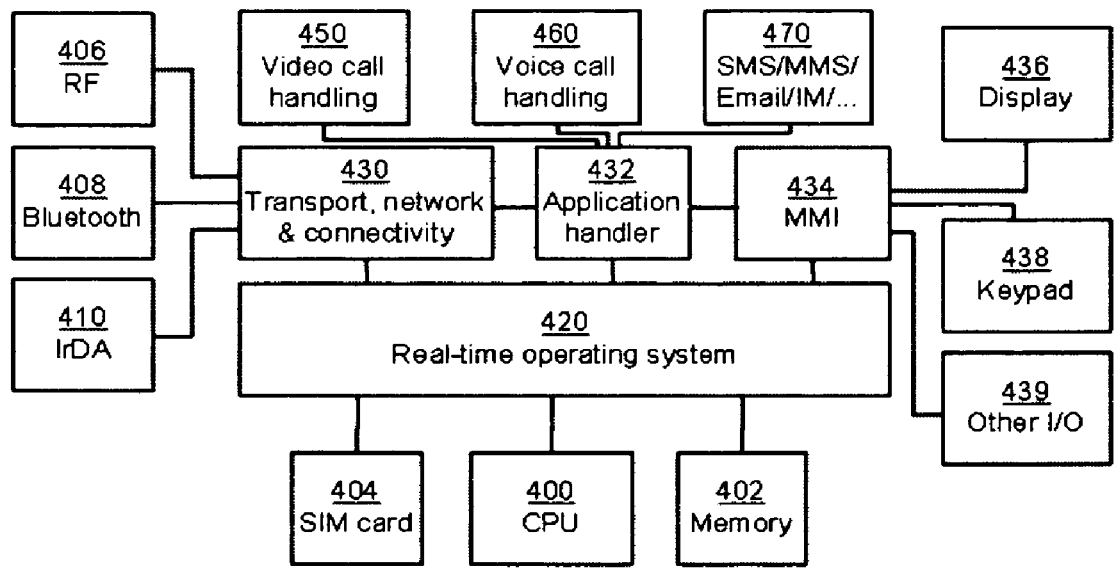
FIG. 4 is a schematic block diagram representing an internal component, software and protocol structure of the mobile terminal shown in FIG. 3.

The internal component and software structure of the mobile terminal 300 will now be described with reference to FIG. 4. The mobile terminal has a controller 400 which is responsible for the overall operation of the mobile terminal and is preferably implemented by any commercially available CPU ("Central Processing Unit"), DSP ("Digital Signal Processor") or any other electronic programmable logic device. The controller 400 has associated electronic memory 402 such as RAM memory, ROM memory, EEPROM memory, flash memory, or any combination thereof. The memory 402 is used for various purposes by the controller 400, one of them being for storing data and program instructions for various software in the mobile terminal. The software includes a real-time operating system 420, drivers for a man-machine interface (MMI) 434, an application handler 432 as well as various applications. The applications include a video call handling application 450, a conventional voice call handling application 460 as well as various other applications 470, such as applications for sending SMS, MMS or email, an instant messaging application, a phone book (contacts) application, a calendar application, a control panel application, a camera application, a mediaplayer, one or more video games, a notepad application, etc.

The MMI 434 also includes one or more hardware controllers, which together with the MMI drivers cooperate with the display 436/303, keypad 438/304 as well as various other I/O devices such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 430 and which provide communication services (such as transport, network and connectivity) for an RF interface 406, and optionally a Bluetooth interface 408 and/or an IrDA interface 410. The RF interface 406 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, i.a., band pass filters, amplifiers, mixers, local oscillators, low pass filters, AD/DA converters, etc.

The mobile terminal also has a SIM card 404 and an associated reader. As is commonly known, the SIM card 404 comprises a processor as well as local work and data memory.

Figure 5:
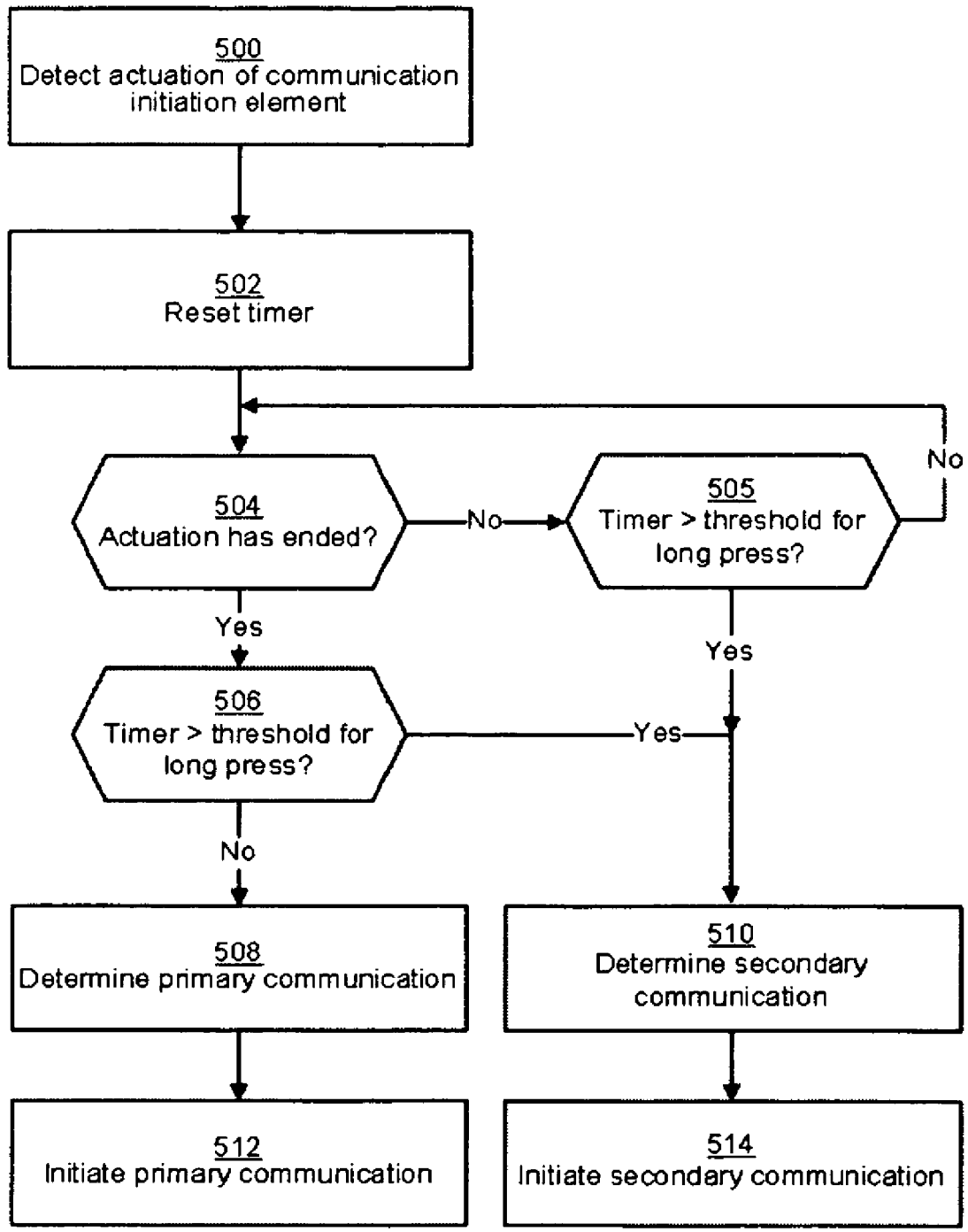
FIG. 5 is a flowchart diagram that illustrates the operation of the mobile terminal shown in FIG. 3 to select a mode of communication.

With reference to FIG. 5, the operation of the mobile terminal 300 for selecting a mode of communication by detecting actuation of the communication initiation element will now be described. In FIG. 5, it is assumed that the user has previously indicated, directly or indirectly, an identifier of an intended receiver such as a phone number with which to establish communication. For example, this may have been performed by entering the phone number directly, using the phone book (contacts) application, locating a phone number in an SMS or MMS message, browsing through a latest calls list, a call reminder from the calendar application, selecting a telephony URL in a browser, etc.

An input element controller, which is either a separate controller or part of a more general MMI controller in MMI module 434, detects in step 500 that the user has depressed the communication initiation element. In step 502, a timer is reset and started. In step 504 it is determined whether the communication initiation element is still depressed. If it is found that the actuation of the element has not ended, it is checked in step 505 if the current duration of the actuation, as given by the timer, exceeds a predetermined threshold or time period. In the described embodiment, the predetermined threshold is 400 milliseconds; in other embodiments it may preferably, but not necessarily, be set to a value between about 100 milliseconds and about 2 seconds. If the predetermined threshold is exceeded, the execution proceeds to step 510, which is described in more detail below.

If it is determined in step 505 that the current duration of the actuation of the communication initiation element not yet exceeds the predetermined threshold, the control is returned to step 504 to continue monitoring the actuation of the element.

If it is found in step 504 that the actuation of the communication initiation element has in fact ended, it is checked in step 506 if the duration of the now-ended actuation exceeds the predetermined threshold. If so, control is passed to step 510 (this is a rare situation which might occur if the user releases the element almost exactly after the lapse of the predetermined time period). Otherwise, the control is passed to step 508, in which the actuation of the communication initiation element is handled as a short-press.

In step 508, the primary mode of communication is determined. As explained in conjunction with FIG. 3 above, the primary (and secondary) modes of communication may preferably be stored in the phone book (contacts) application. Consequently, in this step it is performed a look-up in the phone book using the phone number provided by the user. If no primary mode of communication is found, either because there is no contact with the provided phone number or because the matched contact has no primary mode of communication configured, the primary mode of communication is as a default set to be a voice call. As explained above, the primary mode of communication may be a voice call, a video call, an SMS, an MMS, an email, an instant message or any other form of communication supported by the mobile terminal.

Once the primary mode of communication has been determined, the application, or functionality within an application, responsible for that mode of communication is initiated in step 512 and the phone number is communicated to the application.

In step 510, the actuation of the communication initiation element is handled as a long-press, as determined in step 505, and the secondary mode of communication is determined. This is done in the same manner that the primary mode of communication is determined in step 508, with the difference that the default mode of communication for the secondary mode of communication is preferably a video call. In other words, if a secondary mode of communication is configured for the phone number in question, the configured mode of communication is used, otherwise a video call is considered to be the secondary mode of communication.

Once the secondary mode of communication has been determined, the application, or functionality within an application, responsible for that mode of communication is initiated in step 514 and the phone number is communicated to the application.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An apparatus comprising:
 a first communication mode capable of a specified primary mode of communication and defaulting to a voice call if there is no specified primary mode;
 a second communication mode capable of a specified secondary mode of communication and defaulting to a video call if there is no specified secondary mode;
 a communication initiation element configured at least part of the time to accept input to initiate communication; and
 a controller associated with said communication initiation element,
 said controller being adapted to detect a user actuation of said communication initiation element and to discriminate between at least a first and a second type of said user actuation, and
 said controller being further adapted to generate a control signal for initiating communication using said first communication mode or said second communication mode, depending on whether said user actuation is of said first type or said second type.

2. The apparatus of claim 1, wherein said controller is adapted to discriminate between said first and said second type of said user actuation by determining whether or not a duration of said user actuation exceeds a predetermined time period.

3. The apparatus of claim 1, wherein said controller is further adapted to determine whether to generate a control signal for initiating communication using said first communication mode or said second communication mode based on said user actuation type and a preferred mode of communication associated with an intended receiver of communication.

4. The apparatus of claim 3, wherein said preferred mode of communication is stored by a phone book application.

5. The apparatus of claim 1, wherein said primary mode of communication is selected from a group consisting of voice communication, video communication, SMS communication, MMS communication, e-mail communication and instant messaging communication.

6. The apparatus of claim 1, wherein said secondary mode of communication is selected from a group consisting of voice communication, video communication, SMS communication, MMS communication, e-mail communication and instant messaging communication.

7. The apparatus of claim 3, wherein if no preferred mode of communication is associated with said intended receiver of communication, said apparatus is adapted to generate a control signal initiating said first communication mode if said first type of user actuation is determined, and to generate a control signal initiating said second communication mode if said second type of user actuation is determined.

8. The apparatus of claim 1, wherein said communication initiation element is an element selected from a group consisting of a dedicated send key, a soft key, a multi-way navigation key and a joystick.

9. The apparatus of claim 1, wherein
 said communication initiation element is a send key; and
 said first and second types of said user actuation are short-press and long-press of said send key, or vice versa.

10. The apparatus of claim 1, wherein said controller is further adapted to determine an identifier of an intended receiver of communication, and include said identifier of said intended receiver in said control signal.

11. The apparatus of claim 10, wherein said controller is further adapted to determine said identifier of said intended receiver of communication from a source selected from a group consisting of a directly entered phone number, a phone book application, an SMS, a MMS, a latest calls list, a call reminder from a calendar application, and a telephony URL.

12. A method comprising:
 providing a first mode of communication capable of a specified primary mode of communication that defaults to a voice call if there is no specified primary mode;
 providing a second mode of communication capable of a specified secondary mode of communication that defaults to a video call if there is no specified secondary mode;
 detecting a user actuation of a communication initiation element;
 discriminating between at least a first and a second type of said user actuation; and
 generating a control signal for initiating communication using said first mode of communication or said second mode of communication, depending on whether said user actuation is of said first type or said second type.

13. The method of claim 12, wherein discriminating between at least a first and a second type of said user actuation involves determining whether or not a duration of said user actuation exceeds a predetermined time period.

14. The method of claim 12, wherein generating a control signal for initiating communication involves determining whether to generate a control signal for initiating communication using said first mode of communication or said second mode of communication based on said user actuation type and a preferred mode of communication associated with an intended receiver of communication.

15. The method of claim 12, wherein said primary mode of communication is a mode of communication selected from a group consisting of voice communication, video communication, SMS communication, MMS communication, e-mail communication and instant messaging communication.

16. The method of claim 12, wherein said secondary mode of communication is a mode of communication selected from a group consisting of voice communication, video communication, SMS communication, MMS communication, e-mail communication and instant messaging communication.

17. The method of claim 14, wherein if it is determined that no preferred mode of communication is associated with said intended receiver of communication, said mobile terminal generates a control signal for initiating communication using said first mode of communication if said first type of user actuation is detected and generates a control signal for initiating communication using said second mode of communication if said second type of user actuation is detected.

18. The method of claim 12, wherein said communication initiation element is a send key; and said first and second types of said user actuation are short-press and long-press of said send key, or vice versa.

19. The method of claim 12, comprising:
determining an identifier of an intended receiver of communication; and
including said identifier of said intended receiver in said control signal.

20. The method of claim 19, wherein determining an identifier involves determining said identifier of said intended receiver of communication from a source selected from a group consisting of a directly entered phone number, a phone book application, an SMS, a MMS, a latest calls list, a call reminder from a calendar application, and a telephony URL.

21. A computer program embodied on a memory comprising software instructions that, when executed in a mobile terminal, performs the method according to claim 12.

* * * * *